United States Patent
Puntous et al.

(10) Patent No.: US 11,061,155 B2
(45) Date of Patent: Jul. 13, 2021

(54) METHOD OF DROPPING A PLURALITY OF PROBES INTENDED TO PARTIALLY PENETRATE INTO A GROUND USING A VEGETATION DETECTION, AND RELATED SYSTEM

(71) Applicant: TOTAL SA, Courbevoie (FR)

(72) Inventors: Henri Puntous, Pau (FR); Jean-Luc Boelle, Pau (FR); Olivier De Pellegars, Pau (FR); Remi Estival, Pau (FR); Andrew Feltham, Pau (FR); Jean Baptiste Laffitte, Pau (FR); Pierre-Olivier Lys, Pau (FR); Francis Clément, Pau (FR); Frank Adler, Pau (FR); Paul Barbier, Pau (FR)

(73) Assignee: TOTAL SA, Courbevoie (FR)

( * ) Notice: Subject to any disclaimer, the term of this patent is extended or adjusted under 35 U.S.C. 154(b) by 404 days.

(21) Appl. No.: 16/000,989

(22) Filed: Jun. 6, 2018

(65) Prior Publication Data
US 2018/0356545 A1 Dec. 13, 2018

(30) Foreign Application Priority Data

Jun. 8, 2017 (EP) .................................. 17305687

(51) Int. Cl.
*G01V 1/16* (2006.01)
*G01V 3/16* (2006.01)
(Continued)

(52) U.S. Cl.
CPC ............ *G01V 1/168* (2013.01); *B64C 39/024* (2013.01); *G01V 1/166* (2013.01); *G01V 3/16* (2013.01);
(Continued)

(58) Field of Classification Search
CPC .. G01V 1/168; G01V 3/16; G01V 2210/1425; G01V 1/166; B64C 39/024;
(Continued)

(56) References Cited

U.S. PATENT DOCUMENTS 5,621,460 A * 4/1997 Hatlestad ............ A01M 7/0089
348/265
6,160,902 A * 12/2000 Dickson ................ G01J 3/2803
348/144

(Continued)

FOREIGN PATENT DOCUMENTS

CA         2927529 A1    8/2016
CN      103438869 A     12/2013
(Continued)

OTHER PUBLICATIONS

Extended European Search Report for Application No. 18176442.4 dated Nov. 8, 2018.

*Primary Examiner* — Ian J Lobo
(74) *Attorney, Agent, or Firm* — Troutman Pepper Hamilton Sanders LLP

(57) ABSTRACT

The method comprises flying at least a probe carrier flying vehicle above a dropping area on the ground, the probe carrier flying vehicle carrying probes and a launcher, configured to separate each probe from the probe carrier flying vehicle; activating the launcher to separate at least one of the probes from the probe carrier flying vehicle above the dropping area; falling of the probe from the flying vehicle in the ground of the dropping area; at least partial insertion of the probe in the ground of the dropping area. When the probe carrier flying vehicle is located above a target dropping area, before activating the launcher, the method comprises determining a vegetation information at the target dropping area using a flying vegetation detector.

17 Claims, 5 Drawing Sheets

(51) Int. Cl.
*B64C 39/02* (2006.01)
*G06K 9/00* (2006.01)
*G01V 1/18* (2006.01)

(52) U.S. Cl.
CPC .... *G06K 9/00657* (2013.01); *B64C 2201/024* (2013.01); *B64C 2201/123* (2013.01); *B64C 2201/127* (2013.01); *B64C 2201/128* (2013.01); *G01V 1/184* (2013.01); *G01V 2210/1425* (2013.01)

(58) Field of Classification Search
CPC ........ B64C 2201/123; B64C 2201/024; B64C 2201/127; B64C 2201/128; G06K 9/00657
See application file for complete search history.

(56) References Cited

U.S. PATENT DOCUMENTS

| | | | |
|---|---|---|---|
| 10,627,386 B2 * | 4/2020 | Saez | A01B 79/005 |
| 2009/0290015 A1 * | 11/2009 | Banno | G06K 9/00664 348/61 |
| 2012/0195496 A1 | 8/2012 | Zaman | |
| 2013/0004017 A1 * | 1/2013 | Medasani | G01S 7/412 382/103 |
| 2014/0263822 A1 | 9/2014 | Malveaux | |
| 2014/0312165 A1 | 10/2014 | Mkrtchyan | |
| 2014/0316614 A1 | 10/2014 | Newman | |
| 2015/0134152 A1 | 5/2015 | Coram et al. | |
| 2015/0379702 A1 | 12/2015 | Ulman | |
| 2016/0086161 A1 | 3/2016 | Zhou | |
| 2016/0202695 A1 | 7/2016 | Deroos et al. | |
| 2016/0286128 A1 | 9/2016 | Zhou | |
| 2016/0379369 A1 | 12/2016 | Sugaya | |
| 2017/0006263 A1 | 1/2017 | Sron | |
| 2017/0073070 A1 | 3/2017 | Zhou | |
| 2017/0178222 A1 | 6/2017 | High et al. | |

FOREIGN PATENT DOCUMENTS

| | | |
|---|---|---|
| CN | 205589485 U | 9/2016 |
| CN | 106485229 A | 3/2017 |
| CN | 106600434 A | 4/2017 |
| CN | 106915462 A | 7/2017 |
| EP | 1903297 A2 | 3/2008 |
| EP | 2741264 A1 | 6/2014 |
| KR | 101606516 B1 | 3/2016 |
| KR | 101762809 B1 | 7/2017 |
| KR | 101759130 B1 | 8/2017 |
| WO | WO2008100335 A2 | 8/2008 |
| WO | WO201446803 A2 | 3/2014 |
| WO | WO201577452 A1 | 5/2015 |
| WO | 2015/085155 A1 | 6/2015 |
| WO | WO201629054 A1 | 2/2016 |
| WO | WO2016200494 A1 | 12/2016 |
| WO | WO201721882 A1 | 2/2017 |
| WO | WO2017151984 A1 | 9/2017 |
| WO | WO2017164973 A1 | 9/2017 |
| WO | WO2017176627 A1 | 10/2017 |

* cited by examiner

METHOD OF DROPPING A PLURALITY OF PROBES INTENDED TO PARTIALLY PENETRATE INTO A GROUND USING A VEGETATION DETECTION, AND RELATED SYSTEM

CROSS-REFERENCE TO RELATED APPLICATIONS

The present application claims priority from European Patent Application No. 17305687.0 filed on Jun. 8, 2017, the entire contents of which are hereby incorporated by reference.

FILED OF TECHNOLOGY

The present invention concerns a method of dropping a plurality of probes intended to partially penetrate into a ground, to carry out measurements in the ground, the method comprising the following steps:
- flying at least a probe carrier flying vehicle above a dropping area on the ground, the probe carrier flying vehicle carrying probes and a launching unit, able to separate each probe from the probe carrier flying vehicle;
- activating the launching unit to separate at least one of the probes from the probe carrier flying vehicle;
- at least partial insertion of the probe in the ground of the dropping area.

BACKGROUND

The probe is in particular intended to form a receiver including at least a seismic sensor to conduct a geophysical survey in a region of interest.

The region of interest is notably a region with a difficult access. The region in particular comprises a high density of vegetation, such as a forest, notably a tropical forest. Also, the region may comprise rugged terrain such as hills (for example foothills), cliffs and/or mountains. Also, the region may comprise dangerous to access areas, such as areas with unexploded ordinances (UXO's).

The method can also be applied to any region of interest.

Geophysical measurements obtained during such a survey are critical in building a sub-surface earth image representative of the particular geology in the region of interest, in particular to determine the location of potential reservoirs of oil and gas.

Such a geophysical survey is for example conducted by placing an array of seismic sources into the ground in the region of interest and by deploying seismic sensors able to record reflections of seismic signals produced by the successive sources on the different layers of the earth.

The survey generally requires implanting the sources at various locations, and partially introducing receivers in the ground along several lines to create a dense array of receivers.

The quality of the image obtained after the survey is generally a function of the surface density of sources and/or of receivers. In particular, a significant number of receivers have to be put in place in the ground to obtain an image of good quality. This is in particular the case when a three-dimensional image is required.

Placing sources and sensors in a remote region of interest may be a tedious, dangerous and expensive process. In particular, when the region is barely accessible, such as in a tropical forest and/or in a region with uneven terrain, and/or a region with unexploded ordinances, the sources and the sensors must be carried at least partially by foot by teams of operators. In many cases, clearings must be opened in the forest to place on the ground the relevant equipment and operators. Trails must then be cleared in the forest to put in place the receivers.

These tasks create a strong environmental impact in the region of interest and may induce significant health and safety risks for the operators.

The set-up of the receivers and/or the sources in the ground is a long process which requires drilling the ground, and in the case of the receivers, ensuring that the coupling between the receiver and the ground is adequate.

In order to partially overcome this problem, US2015/0053480 discloses a method in which probes are carried by a flying vehicle such as an unmanned aerial vehicle. The flying vehicle is flown above the location at which the probe should be implanted. Then, the probe is dropped from the flying vehicle and falls to the ground.

The acceleration reached by the probe when it impacts the ground provides sufficient energy to at least partially penetrate the ground and provide coupling with the soil for subsequent measurements.

Nevertheless, such a solution is not entirely satisfactory. The probe being launched over a region with dense vegetation, it may encounter obstacles when falling down towards the ground. In particular, it is likely to collide with tree branches, leaves of high density, large trunks, dense crown and/or wide roots.

Such collisions alter the trajectory of the probe, leading to inaccuracy in the positioning of the probe. In some cases, the probe may lose some mechanical energy before its impact with the ground. This may cause lower or even no penetration of the probe in the ground and poor coupling of the probe.

SUMMARY

One aim of the invention is to obtain a method which allows a simplified installation of a plurality of probes in a region of interest, the method yet providing an efficient coupling of the probes in the ground, even in the presence of dense vegetation.

To this aim, the subject-matter of the invention is a method of the above-mentioned type, characterized by:
- when the probe carrier flying vehicle is located above a target dropping area, before activating the launching unit, determining a vegetation information at the target dropping area using a flying vegetation detector.

The probe according to the invention may comprise one or more of the following features, taken solely or according to any potential technical combination:
- the activation of the launching unit to separate at least one of the probes from the probe carrier flying vehicle is done when the probe carrier flying vehicle is flying above the dropping area;
- the method comprising the falling of the probe from the probe carrier flying vehicle in the ground of the dropping area;
- the flying vegetation detector is carried by the probe carrier flying vehicle;
- the method comprises preventing the activation of the launching unit when the vegetation information at the target dropping area is comprised in a first category of vegetation and/or allowing the activation of the launching unit when the vegetation information at the target dropping area is comprised in a second category of vegetation;

the vegetation information comprises a vegetation height;

the vegetation information comprises a vegetation density, the vegetation density in the first category of vegetation being greater than the vegetation density in the second category of vegetation;

the vegetation density in the second category is a clear terrain density or a sky hole vegetation density;

the vegetation information comprises a vegetation type, the first category of vegetation comprising a first vegetation type, the second category of vegetation comprising a second vegetation type;

the first vegetation type includes high canopy trees, trees with large trunks, dense crown and/or wide roots, the second vegetation type including trees of the Arecales order the method comprises, when the vegetation information at the target dropping area is comprised in the first category of vegetation, seeking an alternate dropping area having a vegetation information in the second category of vegetation, in a neighboring zone of the target dropping area where the vegetation information is in the first category of vegetation;

a span of the neighboring zone is at most 5 m to 10 m from the target dropping area where the vegetation density information is in the first category of vegetation the method comprises, before flying the probe carrier flying vehicle to the target dropping area, obtaining a preliminary survey of potential vegetation information in a region of interest by at least an aerial platform distinct from the or each probe carrier flying vehicle, and defining at least a target dropping area where the potential vegetation information is in the second category based on the survey of potential vegetation information;

the aerial platform is a satellite, a balloon, an airship, an airplane, an unmanned aerial vehicle and/or a helicopter;

the flying vegetation detector comprises an electromagnetic sensor, in particular an optical sensor;

the sensor is a LIDAR.

The invention further concerns a system for dropping a plurality of probes intended to partially penetrate into a ground, to carry out measurements in the ground, comprising:

at least a probe carrier flying vehicle intended to fly above a dropping area on the ground, the probe carrier flying vehicle carrying probes and a launching unit, able to separate each probe from the probe carrier flying vehicle;

an activation unit able to activate the launching unit to separate at least one of the probes from the probe carrier flying vehicle;

characterized by:

at least a flying vegetation detector, the activation unit being able to determine a vegetation information at a target dropping area of the probe using the flying vegetation detector when the probe carrier flying vehicle is located above a target dropping area before activating the launching unit.

The system according to the invention may comprise one or more of the following features, taken solely or according to any technical feasible combination:

the activation unit is able to activate the launching unit to separate at least one of the probes from the probe carrier flying vehicle when the probe carrier flying vehicle is flying above the dropping area and to let the probe fall from the probe carrier flying vehicle in the ground of the dropping area;

the probe carrier flying vehicle carries the flying vegetation detector;

the activation unit is able to prevent activation of the launching unit when the vegetation information at the target dropping area is comprised in a first category of vegetation and/or is able to allow activation of the launching unit when the vegetation information at the target dropping area is comprised in a second category of vegetation the flying vegetation detector comprises an electromagnetic sensor, in particular an optical sensor.

BRIEF DESCRIPTION OF THE DRAWINGS

The invention will be better understood, based on the following description, given solely as an example, and made in reference to the following drawings, in which.

DETAILED DESCRIPTIONS

Figure 1:
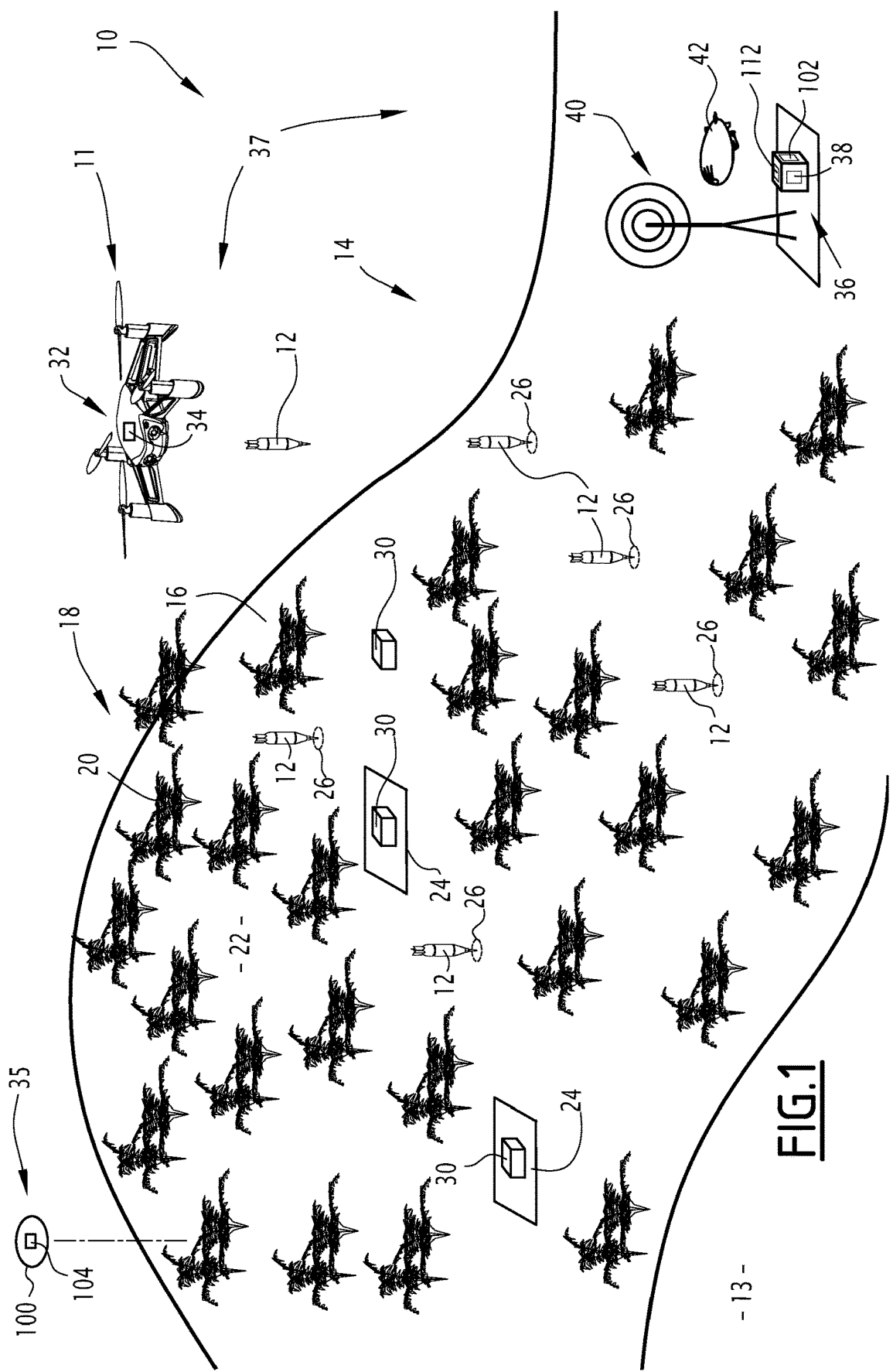
FIG. 1 is a schematic view of a region of interest comprising a ground survey assembly according to the invention.

A first ground survey assembly 10 comprising a plurality of probes 12 put in place by a dropping system 11 according to the invention is disclosed schematically in FIG. 1.

The ground survey assembly 10 is for carrying out a geophysical survey of an onshore region of interest 14 schematically shown in FIG. 1.

The assembly 10 is used in particular to collect geophysical data and measurements for determining the physical properties of the subsurface 13 located in the region of interest and/or for building an image of the geology of the subsurface 13, preferably a three-dimensional image of the subsurface 13.

The region of interest 14 is for example a region having an uneven terrain 16. The uneven terrain 16 in particular comprises hills, mountains, cliffs or any type of rugged terrain. The region of interest 14 is for example located on foothills which are difficult to access.

The region of interest 14 further comprises vegetation 18. The vegetation 18 is for example a forest, in particular a tropical forest. It comprises a high density of vegetation, for example trees 20 forming a canopy 22 which covers a majority of the surface of the ground in the region of interest 14.

The subsurface 13 located below the ground comprises layers of geological formation and potentially oil and gas reservoirs.

In the region of interest 14, the vegetation 18 defines a plurality of natural and/or artificial clearings 24. The vegetation 18 in the region of interest 14 also defines sky holes 26 in the canopy 22.

The clearings 24 are spread in the region of interest 14, at a distance generally comprised between 100 m and 500 m, preferentially around 300 m, taken along the line of sight between two adjacent clearings 24.

The clearings 24 generally have a surface area greater than 25 m$^2$, at the ground level and generally greater than 900 m$^2$ at the top of the canopy 22. The seismic sources 30 can be put in place in the clearings 24.

A clearing 24 is for example defined in a OGP Standard "OGP-Helicopter Guideline for Land Seismic and Helirig operations—Report 420 version 1.1 Jun. 2013

Sky holes 26 are generally natural. They advantageously form a vertical "light tube" between the canopy 22 and the ground.

For example, the sky holes 26 have a minimal surface area greater than 1 m$^2$, preferentially greater than 3 m$^2$, and comprised for example between 3 m$^2$ and 20 m$^2$. The probes 12 are able to be dropped in each sky hole 26, as will be described later.

At least a sky hole 26 has a surface area which is smaller than the surface area of the clearings 24.

The ground survey assembly 10 comprises a plurality of sources 30, able to generate a geophysical stimulus in the ground, in particular a seismic signal. The ground survey assembly 10 further comprises a plurality of probes 12 spread in the region of interest 14 to collect geophysical data arising from the seismic signal generated by the sources 30.

In the example of FIG. 1, the ground survey assembly 10 further comprises the dropping system 11 for dropping the probes 12. The dropping system 11 includes a fleet of probe carrier flying vehicles 32, able to fly above the vegetation 18 to carry each probe 12 above its point of installation, and, for each probe carrier flying vehicle 32, a launching unit 34 able to separate each probe 12 carried by the flying vehicle 32 above the ground to let the probe 12 free fall to its installation point in the ground.

According to the invention, the dropping system 11 also comprises a dropping area predetermination system 35 (see FIG. 1), to predetermine the location of a plurality of target dropping areas in the region of interest 14, before each probe carrier flying vehicle 32 is flown above the region of interest 14. The dropping system 11 also includes a dropping area flying detection system 37 (see FIG. 3), to verify if each target dropping area is at the predetermined location, when the probe carrier flying vehicle 32 flies above the target dropping area.

The ground survey assembly 10 further comprises at least a base 36 (or secondary camp), comprising at least a collection and/or analysis unit 38 and a telecommunication system 40 able to transfer data measured by the probes 12 to the collection and/or analysis unit 38, and from the collection and/or analysis unit 38 to an external station (not shown).

The base 36 advantageously comprise a helipad, night facilities for crews, and/or antenna which collect data from small antenna located in the vicinity. It is used for management of the take-off and landing. It may be used for first aid (e.g. medevac).

The external station may be located at a main camp (not shown). The main camp advantageously comprises facilities for collecting data, as well as a main computing unit, and/or a control center.

Advantageously, the ground survey assembly 10 comprises at least an additional flying vehicle 42 (shown in FIG. 1) able to fly over the vegetation to carry the sources 30 in the clearings 24.

Each seismic source 30 is able to generate a controlled seismic energy generating a geophysical stimulus, in particular a seismic signal in the ground.

The source 30 for example comprises an explosive, in particular dynamite, able to generate the geophysical stimulus.

The source 30 is inserted in a hole drilled into the ground, for example at a depth comprised between 0 meter and 100 meters, preferably between 5 meters and 80 meters.

In a variant, the source 30 comprises a mechanical device such as a hammer, a vibrator.

The density of sources 30 locations laid in the region of interest 14 is generally comprised between 10 source locations per km$^2$ and 100 source locations per km$^2$. Each source location can comprise one or more source 30.

Each source 30 is preferably arranged in a clearing 24. The source 30 is generally brought to the clearing 24 by the additional flying vehicle 42. It can be put in place by a unmanned ground vehicle, such as a semi automatic drilling platform.

Each probe 12 is partially introduced in the ground to sense in particular the seismic signals resulting from interactions of the seismic stimulus generated by a source 30 with the geology of the subsurface 13.

The density of probes 12 is comprised for example between 10 probes per km$^2$ and 1000 probes per km$^2$, in particular between 300 probes per km$^2$ and 500 probes per km$^2$, notably 400 probes per km$^2$.

Figure 2:
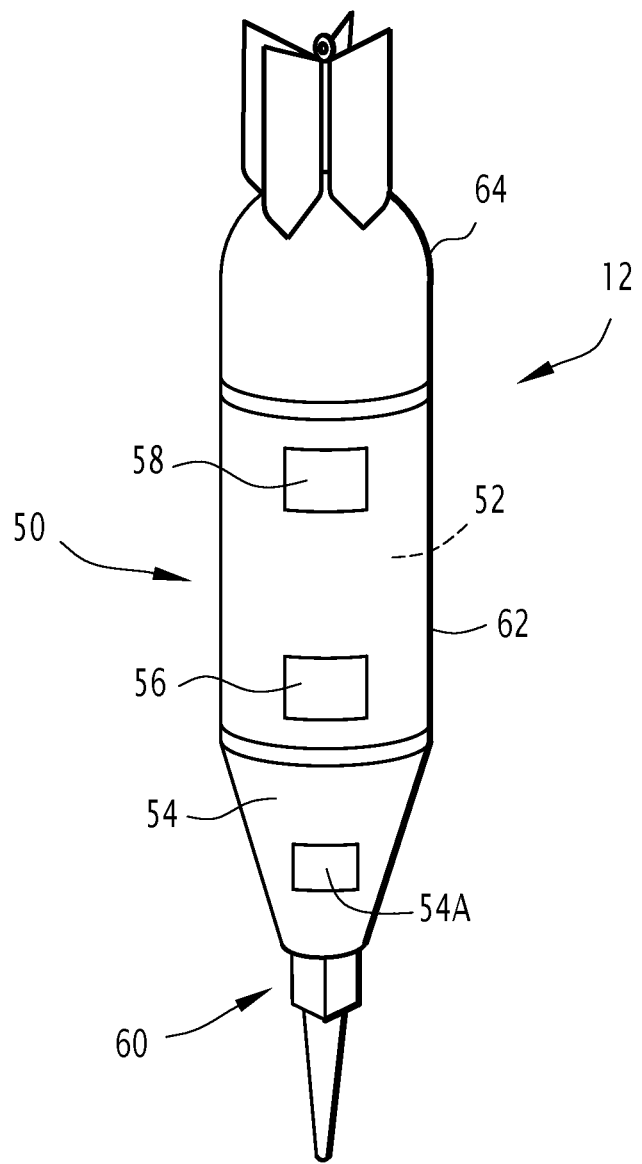
FIG. 2 is an external partial perspective view of a probe according to the invention.

In the example shown in FIG. 2, each probe 12 has the shape of a dart. In a variant, the probe 12 has the shape of a ball or a parallel pipe shape.

The probe 12 comprises a hollow casing 50 defining a closed inner compartment 52, a sensor unit 54 comprising at least a sensor 54A received in the closed inner compartment 52 to sense at least a physical quantity, in particular a seismic signal.

The probe 12 further comprises an emitter 56 able to collect and send via an antenna (not shown) data representative of the physical quantity sensed by the sensor unit 54, and at least a power source 58 able to power the sensor unit 54 and/or the emitter 56. The emitter 56 and the power source 58 are also received in the closed inner compartment 52 of the hollow casing 50.

In this example, the hollow casing 50 advantageously comprise a tapered lower end 60 to penetrate the ground, a central tubular partition 62, and a rear closing part 64 mounted at the rear of the central partition 62 opposite from the tapered lower end 60.

The sensor 54A comprises at least one geophone, in particular three geophones and/or an accelerometer.

The fleet of probe carrier flying vehicle 32 comprises a plurality of probe carrier flying vehicles 32, for example between 2 and 1000 probe carrier flying vehicles 32, preferably between 10 and 100 probe carrier flying vehicles 32.

Figure 3:
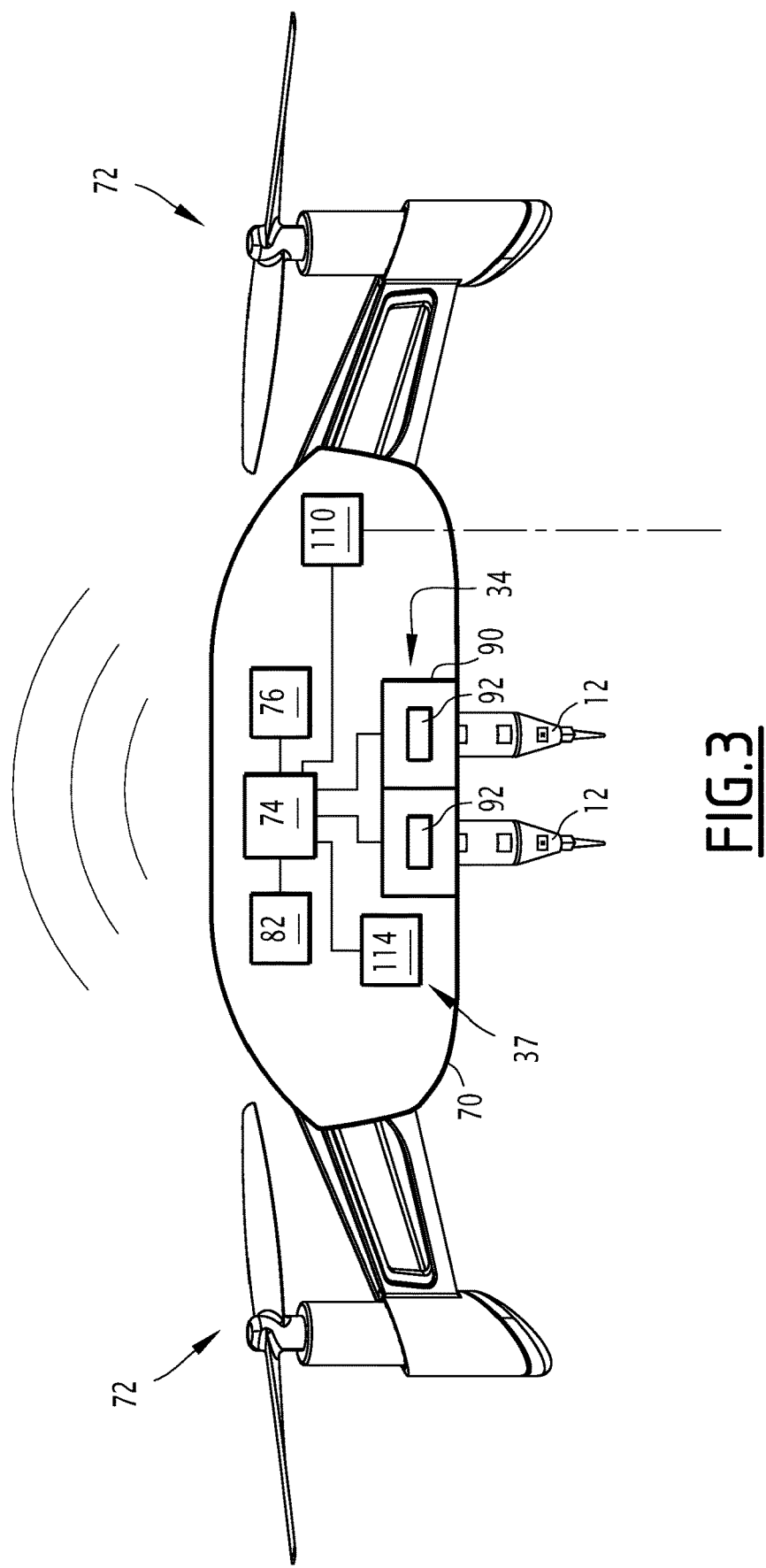
FIG. 3 is a schematic view of a probe carrier flying vehicle used in the method according to the invention.

As shown in FIG. 3, each probe carrier flying vehicle 32 comprises a platform 70 carrying the launching unit 34 and the probes 12, and at least a propeller 72, in this example a plurality of propellers 72.

Each probe carrier flying vehicle 32 further comprises a central control unit 74 for driving the propellers 72 and directing the probe carrier flying vehicle 32 above the dropping area at which each probe 12 has to be put in place.

The probe carrier flying vehicle 32 further comprises a communication unit 76 for receiving guidance data from the base 36 and for sending data to the base 36 through the telecommunication system 40.

The central control unit 74 is able to receive data from the base 36 regarding the trajectory and/or the target position to be reached by the probe carrier flying vehicle 32. It is for example connected to a position detector 82 such as a ground positioning system.

The central control unit 74 is also able to activate the propellers 72 to fly the probe carrier flying vehicle 32 to the aimed target position along the desired trajectory.

The launching unit 34 comprises at least a retainer 90 able to hold at least a probe 12 in the platform 70, and at least a release mechanism 92 able to release the retainer 90 to free the probe 12 from the retainer 90 and let it fall down to the dropping area.

A volume located below the retainer 90 is advantageously open to let the probe 12 free fall from the platform 70. The release mechanism 92 is connected to the central control unit 74 for its actuation. It is able to release the retainer 90, without providing thrust to the probe 12.

In a variant, the probe 12 can be launched toward the ground. The launching impulse can be obtained by the integration of a thruster (ex: pyrotechnic, turbine, propeller . . . ) in the probe 12, or by the use of a propulsion mechanism onboard the probe carrier flying vehicle 32 (e.g. launching actuator or the decompression of a spring). The impulse accelerates the fall of the probe 12 to help it penetrate further into the canopy 22 and/or the ground.

In yet another variant, the fall of the probe 12 can be slowed down by a braking mechanism (e.g. a parachute attached to the rear closing part 64). Slowing down the fall of the probe 12 can for instance avoid damages to the probe.

In reference to FIG. 1, the dropping area ground predetermination system 35 comprises at least an aerial observation platform 100, able to collect information representative of the vegetation at a plurality of locations in the region of interest 14, and an analyzer 102 able to analyze the vegetation information and determine locations of target dropping area and potential vegetation information at the target dropping area.

The aerial observation platform 100 is for example a satellite, a balloon, an airship, an airplane, an unmanned aerial vehicle and/or a helicopter. The platform 100 is equipped with at least a vegetation detector 104 able to collect data representative of the vegetation information at various locations of the region of interest 14.

The aerial observation platform 100 is able to pass above the region of interest 14 before determining potential locations of the probes 12 in the region of interest 14.

The vegetation detector 104 is for example an optical detector. It comprises in particular an optical camera, and/or an optical sensor such as a LIDAR.

The LIDAR is able to illuminate the vegetation 18 with a pulsed laser light and to measure the reflected pulse with a sensor. A digital representation of the region of interest can be established based on the data collected at various locations.

The data collected with the vegetation detector 104 at a particular location depends on the vegetation type and/or density at the particular location and constitutes a vegetation information at the particular location.

The analyzer 102 is able to analyze the vegetation information collected by the vegetation detector 104 to determine the type of vegetation and/or the density of vegetation at a particular location.

The analyzer 102 is able to sort the vegetation information, in order to determine whether the vegetation information at a particular location is comprised in a first category of vegetation, which prevents the location to become a target dropping area, and a second category of vegetation, which allows the location to become a target dropping area.

Preferentially, the vegetation information comprises a vegetation density calculated from the data collected by vegetation detector 104. The vegetation density in the first category of vegetation is greater than the vegetation density in the second category of vegetation. A density threshold is predefined to delimit a minimal vegetation density in the first category and a maximal vegetation density in the second category of vegetation.

Advantageously, in the second category of vegetation, the area is a clear terrain.

The vegetation density is for example the vegetation density of a clearing 24 or of a sky hole 26.

Additionally, or in variant, the vegetation information comprise a type of vegetation.

The first category of vegetation comprises a first vegetation type, whereas the second category of vegetation comprises a second vegetation type.

For example, the first vegetation type includes high canopy trees. The first vegetation may include trees with large trunks, for example having a trunk diameter at the base greater than 1 m, trees with a dense crown, for example with a crown having a diameter greater than 30 m, and/or trees with wide roots, e.g., trees having roots of transverse extent greater than 10 m.

On the contrary, the second vegetation type includes trees with smaller trunks, smaller crowns and roots with lesser transverse extent.

Trees of the second vegetation type for example include trees of the Arecales order such as palm trees.

The analyzer 102 is able to analyze the data collected by the vegetation detector 104, in particular the color and/or intensity of the collected data at a particular location in the region of interest 14 to determine whether the particular location has a vegetation information, in particular a vegetation density and/or a vegetation type in the first category of vegetation or in the second category of vegetation.

Advantageously, the analyzer 102 is able to determine the locations of clearings 24 or/and of sky holes 26, based on the vegetation information collected by the vegetation detector 104.

The location of clearings 24 and/or skyholes 26 can be for example carried out by identifying locations of trunks, the extent of the crown from each trunk and by determining the clear areas between the crowns.

The analyzer 102 is therefore able to map the locations potentially having a first category of vegetation preventing the dropping of a probe and the locations potentially having a second category of vegetation, which allows the dropping of a probe.

Based on the analysis made by the analyzer 102, and based on additional geophysical and logistical parameters, a number of target dropping areas in which the vegetation is in the second category of vegetation can be predetermined.

The dropping area flying detector system 37 comprises at least a flying vegetation detector 110 carried by a flying platform to measure the vegetation information at the target dropping area when a probe carrier flying vehicle 35 has reached the target dropping area. The dropping area flying detector system 37 further comprises an activation unit 112, advantageously located at the base 36 to control the activation of the launching unit 34 depending on the vegetation information measured at the target dropping area using the flying vegetation sensor 110.

In FIG. 3, the dropping area detecting system 37 also comprises a redirection unit 114, able to seek an alternate dropping area in a neighboring zone of the target dropping area if the vegetation at the target dropping area is not suitable for dropping the probe 12.

As shown in FIG. 3, the flying vegetation detector 110 is for example carried by the probe carrier flying vehicle 32, or by another flying vehicle such as unmanned safety clearance vehicle.

The flying vegetation detector 110 is advantageously of the same type as the vegetation detector 104. Preferentially, the flying vegetation detector 110 is an optical detector such as a laser and/or a LIDAR. Its focus direction points downwardly towards the ground from the probe carrier vehicle 32.

The flying vegetation detector 110 is able to send an optical signal towards the ground, and to measure the intensity and/or wavelength of the reflected signal which constitutes vegetation information.

The activation unit 112 is able to analyze the vegetation information received from the flying vegetation detector 110, in order to determine whether the vegetation information at the target dropping area is comprised in a first category of vegetation, which prevents the dropping of the probe 12, or is comprised in a second category of vegetation, which allows dropping of the probe 12.

The vegetation information may comprise a vegetation height. The vegetation height measured by the flying vegetation detector 110 based on the reflection time of the signal. It is compared to the ground height and/or to the height of the canopy 22 in the neighboring areas.

In a particular example, if the vegetation height measured at a particular location is close to the ground height (for example having a difference of less than 50% with the ground height), then, the vegetation information at the particular location. is in the second category of vegetation.

On the contrary, if the vegetation height measured at a particular location is close to the canopy height of the neighboring area (for example having a difference of less than 50% with the canopy height), then the vegetation information at the particular location. is in the first category of vegetation.

As defined above, the vegetation information may comprise a vegetation density, the vegetation density in the first category of vegetation being greater than the vegetation density in the second category of vegetation. A threshold of vegetation density can be predetermined for example by experimental measurement. Preferably, the vegetation in the second category is a clearance 24 vegetation density or a sky hole 26 vegetation density.

Additionally or in a variant, the vegetation information comprises a vegetation type, with a first category of vegetation as defined above and a second category of vegetation as defined above.

In an embodiment; the activation unit 112 is able to provide a clearance signal to the launching unit 34 if the vegetation information is in the second category of information.

In an alternate and/or complementary embodiment, the activation unit 112 is able to prevent the activation of the launching unit 34 if the vegetation type at the potential dropping point is in the first vegetation category.

The activation unit 112 is preferably located on the ground. It is for example located at the base 36. It is able to receive data from the flying vegetation detector 104 though the telecommunication system 40. It is able to send data to the launching unit 24 through the telecommunication system 40, in particular, a clearance signal allowing the activation of the launching unit 34 and/or a prevention signal inhibiting the activation of the launching unit 34.

The redirection unit 114 is able to relocate the probe carrier flying vehicle 32 in a neighboring zone around the target dropping area when the vegetation information at the target dropping area is determined to be in the first category of vegetation, in order to seek an alternate dropping area in which the vegetation information is in the second category of vegetation.

Figure 5:
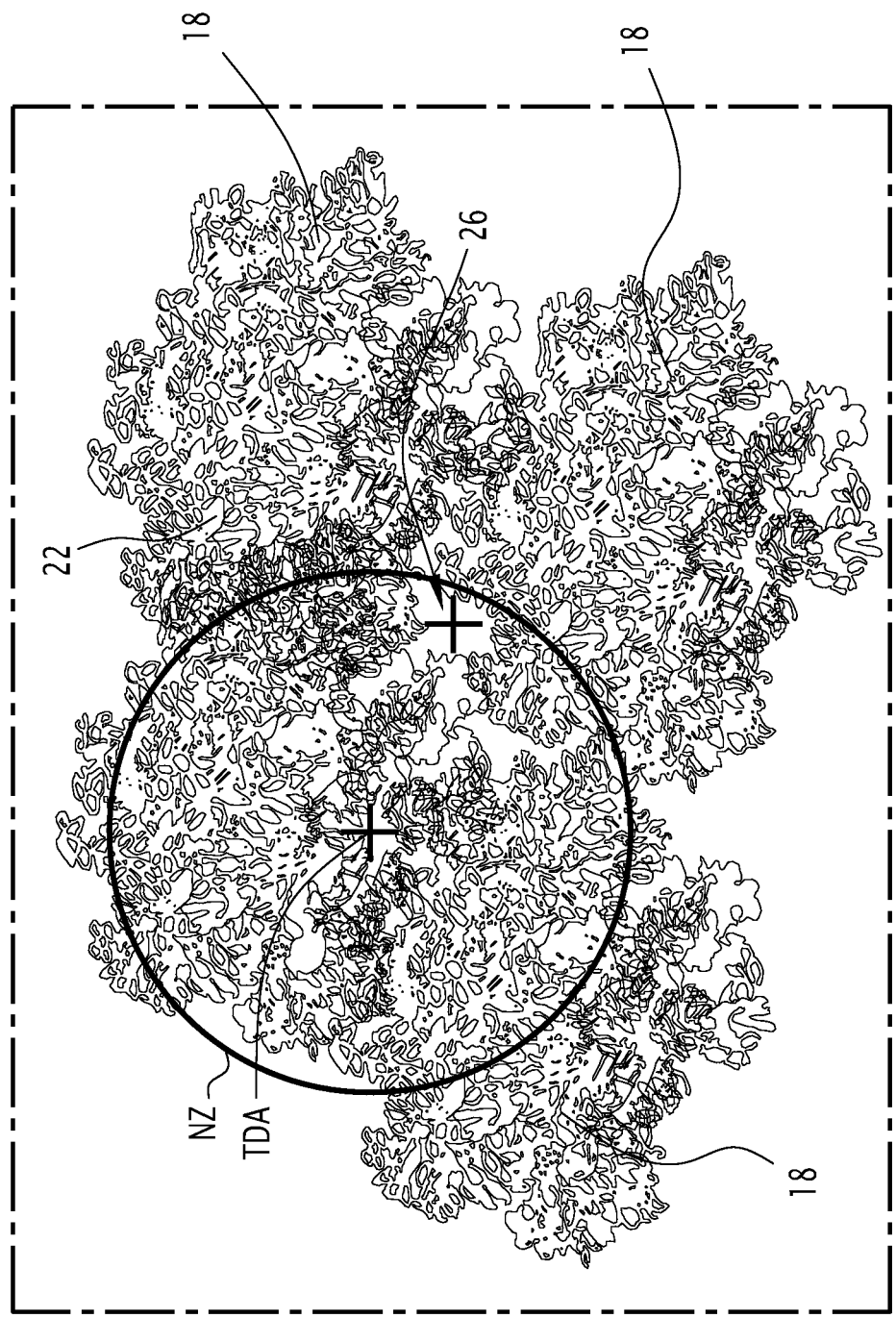
FIG. 5 is a top view of a canopy during an additional step of a method according to the invention.

In reference to FIG. 5, the redirection unit 114 is for example able to move the probe carrier flying vehicle 32 in a neighboring zone NZ of the target dropping area TDA having a span of at most 5 m to 10 m of the original target dropping area.

The flying vegetation detector 110 is able to be moved above the neighboring zone NZ to measure vegetation information at several locations in the neighboring zone, in order to find an alternate dropping area having a vegetation information in the second category of vegetation.

If the redirection unit 114 does not find an alternate dropping area in the second category of vegetation, the redirection unit 114 is able to let the probe carrier flying vehicle 32 move to a further target dropping area, and/or to return to the base 36.

In reference to FIG. 1, the telecommunication system 40 comprises antennas located in at least part of the clearings 24, and/or flying antennas. It is able to collect data received from the emitter 56 of each probe 12 and to convey it to the collection and analysis unit 38 at the base 34. It is also able to transfer data between the activation unit 112 at the base 36 and the communication unit 76 of each probe carrier flying vehicle 32.

The additional flying vehicle 42 is for example a helicopter an airship (ex: hybrid airship . . . ) or a balloon which is able to carry the sources 30 towards each clearing 24.

The installation and operation of the ground survey assembly 10 according to the invention will be now described.

Initially, the aerial observation platform 100 is moved above the region of interest 14 to carry out measurements of vegetation information at various locations with the vegetation detector 104.

Preferentially, a full scan of the region of interest 14 is carried out to determine a map of vegetation information as a function of location in the region of interest 14.

Then, the analyzer 102 analyzes the vegetation information measured with the vegetation detector 104 to determine whether the vegetation information is in a first category of vegetation, which prevents the dropping of probes 12 and or in a second category of vegetation, which allows the dropping of probes 12.

As explained above, the analyzer 102 for example analyzes the intensity and/or wavelength of the measured signal, to determine a vegetation density at each measured location.

Based on a predetermined threshold, the analyzer 102 sorts whether the vegetation density is in a first category of vegetation, or in the second category of vegetation.

In particular, the analyzer 102 determines whether the vegetation density corresponds to a clearing 24, and/or to a sky hole 26.

In a variant, or in complement, based on the wavelength and intensity of the measured signal, and on a correlation table, the analyzer 102 analyzes a vegetation type and sorts among a first vegetation type corresponding to a first category of vegetation and a second vegetation type corresponding to a second category of vegetation.

For example, the first vegetation type includes high canopy trees. The second vegetation type includes trees of the Arecales order.

Based on the mapping of the vegetation information as a function of location, a preliminary survey of potential vegetation information at each location of the region of interest 14 is established, to allow the definition of target dropping areas for the probes 12, using other parameters such as geophysical parameters and/or logistical parameters.

Once a plurality of target dropping areas have been defined, each probe carrier flying vehicle 32 is flown from the base 36 to a target dropping area.

The flying vegetation detector 110 is then activated to measure an actual vegetation information at the target dropping area. The activation unit 112 receives the vegetation information, and determines whether the vegetation information measured at the target dropping area is comprised in a first category of vegetation preventing the activation of the launching unit 34 or in a second category of vegetation allowing the activation of the launching unit 34, as defined above.

In an embodiment, the activation unit 112 provides a clearance signal to the launching unit 34 only if the vegetation information measured by the flying vegetation detector 110 at the target dropping area is in the second category of vegetation.

The clearance signal is then transmitted to the central control unit 74 of the probe carrier flying vehicle 32 through the telecommunication system 40 and through communication unit 76.

The central control unit 74 then activates the release mechanism 92 to free the probe 12 from the retainer 90. The probe 12 falls down from the retainer 90 to the ground, and penetrates at least partially into the ground to establish coupling between the sensor unit 54 and the ground.

In a variant or in complement, the activation unit 112 sends a prevention signal to the launching unit 34, preventing the activation of the launching unit 34 if the vegetation information measured by the flying vegetation detector 110 at the target dropping area is in the first category of vegetation.

If the activation unit 112 determines that the vegetation information is in the first category of vegetation, the redirection unit 114 modifies the position of the probe carrier flying vehicle 32, to scan a neighboring zone NZ around the target dropping area TDA with the flying vegetation detector 110.

The span of the neighboring zone NZ is at most 5 m to 10 m from the target dropping area TDA. The flying vegetation detector 110 is activated to carry out measurements of vegetation information at various locations in the neighboring zone NZ, and to send it to the activation unit 112.

If the activation unit 112 determines that the information vegetation at an alternate dropping area in the neighboring zone NZ is in the second category, it provides a clearance signal to the launching unit 34 which carries out the launch of the probe 12 as described above.

On the contrary, if no alternate dropping area having a vegetation in the second category of vegetation is found in the neighboring zone NZ, the redirection unit 114 lets the probe carrier flying vehicle 32 move to a further target dropping area and/or to the base 36.

Thanks to the method according to the invention, a plurality of target dropping area for the probes 12 can be easily defined based on an initial determination of vegetation information at a plurality of locations in the region of interest 14. Then, when each probe carrier flying vehicle 32 flies to a target dropping area, the flying vegetation detector 110 is able to verify the vegetation information at the target dropping area, to confirm that the type of vegetation present at the target dropping area is compatible with the launching of a probe 12.

This greatly increases the chances for the probe 12 to be successfully launched and coupled to the ground without significant interference with the vegetation 18.

The plurality of probes 12 are then preferentially launched in artificial or natural clearings 24 of the region of interest 14 and into sky holes 26 of the region of interest 14.

In case the vegetation information actually measured at the target dropping area just before launching the probe 12 is not consistent with the initial measurement carried out before defining the positions of the target dropping areas, a neighboring zone NZ around the target dropping area is advantageously scanned to determine if an alternate dropping area can be found. This increases the productivity of the dropping method by avoiding an unnecessary return to the base 36.

Figure 4:
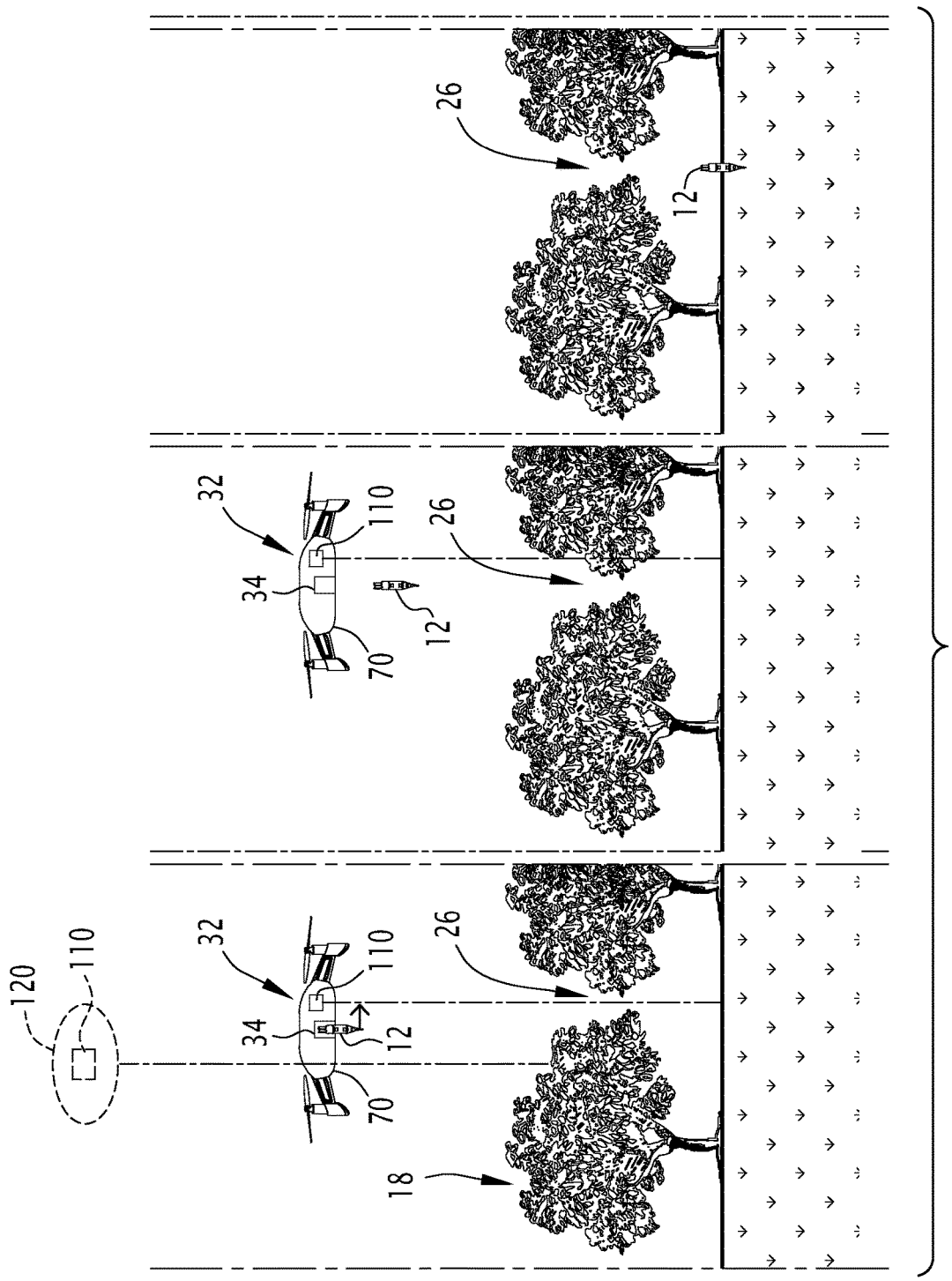
FIG. 4 is a schematic view of a method for installing the probes according to the invention.

In a variant shown in dotted lines in FIG. 4, the flying vegetation detector 110 is carried by an additional flying vehicle 120, distinct form the probe carrier flying vehicles 32. The additional flying vehicle 120 is devoid of launching unit 34. It advantageously flies above the probe carrier flying vehicle 32.

In a variant in which the probe 12 is equipped with an accelerometer, the coupling of each probe 12 is assessed based on a measurement of the vertical acceleration versus time of the probe 12 from its launching to its impact.

The fall of the probe 12 is then advantageously monitored to determine whether it was direct to the ground or whether it was hindered, based of variations of the signal of the accelerometer during the fall.

The duration of flight is also calculated by determining the time of release and the time of impact. Knowing the fall height, the velocity at impact can be calculated.

Other parameters such as duration of impact, maximum deceleration, potential rebound can also be evaluated from the variation and intensity of the accelerometer signal versus time at impact.

In a variant, the probes 12 are put in place by landing the probe carrier flying vehicle 32 at the dropping area. The launching unit 34 is activated when the probe carrier flying vehicle 32 has landed. The launching unit 34 advantageously comprises a tool to at least partially insert the probe 12 in the ground, for example by drilling.

When the probe carrier flying vehicle 32 is located above a target dropping area, before landing the probe carrier flying vehicle 32 and before activating the launching unit 34, vegetation information at the target dropping area is obtained using a flying vegetation detector 110, as described above.

In other variations, the probe 12 is partially or totally recovered at the end of the survey.

In an embodiment, the probe 12 is equipped with a recovery member, such as a hook or a ring on its upper part. A recovery flying vehicle, such as an unmanned aerial vehicle as described above, flies above the probe 12 and picks up the probe 12 using the recovery member.

The pickup of the probe 12 can be total or partial, depending on the force available in the recovery flying vehicle. In the latter case, the part of the probe 12 remaining in the ground is advantageously biodegradable (such as disclosed e.g. in EP3080642).

In another embodiment, the probe 12 is dropped from above the canopy 22 with a link, such as a wire or a cable, connected to it, the free end of the link remaining at the top of the canopy 22 to be picked up by the recovery flying vehicle.

The link is advantageously equipped with a recovery member at its free end (for example a balloon inflated with lighter than air gas). Advantageously, the link may constitute or bear an antenna connected to the emitter 56.

Just as before, the pickup of the probe 12 is total or partial.

In a variant or in addition, the system 11 comprises at least a flying ground surface detector, the activation unit 112 being able to determine a ground surface information at a target dropping area of the probe 12 using the ground surface vegetation detector when the probe carrier flying vehicle 32 is located above a target dropping area before activating the launching unit 34.

Advantageously, the activation unit 112 is able to prevent activation of the launching unit 34 when the ground surface information at the target dropping area is comprised in a first category of ground surface and/or is able to allow activation of the launching unit 34 when the ground surface information at the target dropping area is comprised in a second category of ground surface.

The first category of ground surface comprises locations comprising at least a physical obstacle on the ground preventing the adequate coupling of the probe 12 in the ground. The physical obstacle can be for example a large rock, a large tree, a construction, in particular a building, a vehicle, etc . . . .

On the contrary, the second category of ground surface comprises locations without physical obstacle on the ground, these locations allowing the adequate coupling of the probe 12 in the ground. The second category of locations comprise for example open fields, clearings, open holes, etc The flying ground surface detector is for example an optical or hyperspectral camera, a LIDAR . . . . It is able to analyze the nature of the ground surface and/or the size of elements detected on the ground surface for example by image or LIDAR data analysis, and/or automatic pattern and form recognition to sort whether the detected ground surface belongs to the first category of ground surface or to the second category of ground surface. Automatic pattern and form recognition can be performed by techniques known in the art such as machine learning to train a machine to recognize objects (for instance boulders, buildings, vehicles . . . )

Preferentially, the flying ground surface detector is carried by the probe carrier flying vehicle 32.

Advantageously, as described above for the vegetation detector 110, the system 11 comprises a redirection unit 114, able to seek an alternate dropping area in a neighboring zone NZ of the target dropping area TDA if the ground surface at the target dropping area TDA is in the second category of ground surface, a span of the neighboring zone being preferably at most 5 m to 10 m from the target dropping area TDA where the ground surface information is in the first category of ground surface.

The invention claimed is:

1. A method of dropping a plurality of probes intended to partially penetrate into a ground, to carry out measurements in the ground, the method comprising:
    flying at least a probe carrier flying vehicle above a dropping area on the ground, the probe carrier flying vehicle carrying probes and a launcher, configured to separate each probe from the probe carrier flying vehicle;
    activating the launcher with an activation unit to separate at least one of the probes from the probe carrier flying vehicle;
    at least partial insertion of the probe in the ground of the dropping area;
    when the probe carrier flying vehicle is located above a target dropping area, before activating the launcher, determining a vegetation information at the target dropping area using a flying vegetation detector, the flying vegetation detector being an optical detector, wherein the optical detector is a laser or LIDAR;
    wherein determining a vegetation information comprises the flying vegetation detector sending an optical signal towards the ground, and measuring the intensity and/or wavelength of the reflected signal or measuring the reflection time of the signal,
    the vegetation information being a vegetation density, a vegetation type or a vegetation height;
    the activation unit analyzing the vegetation information received from the flying vegetation detector, in order to determine whether the vegetation information at the target dropping area is comprised in a first category of vegetation, which prevents the dropping of the at least one of the probes, or is comprised in a second category of vegetation, which allows dropping of the at least one of the probes,
    the method comprising preventing the activation of the launcher when the vegetation information at the target dropping area is comprised in the first category of vegetation and/or allowing the activation of the launcher when the vegetation information at the target dropping area is comprised in the second category of vegetation.

2. A method according to claim 1, wherein the activation of the launcher to separate at least one of the probes from the probe carrier flying vehicle is done when the probe carrier flying vehicle is flying above the dropping area;
    the method comprising the falling of the probe from the probe carrier flying vehicle in the ground of the dropping area.

3. The method according to claim 1 wherein the flying vegetation detector is carried by the probe carrier flying vehicle.

4. The method according to claim 1, wherein the vegetation information comprises a vegetation height.

5. The method according to claim 1, wherein the vegetation information comprises a vegetation density, the vegetation density in the first category of vegetation being greater than the vegetation density in the second category of vegetation.

6. The method according to claim 5, wherein the vegetation density in the second category is a clear terrain density or a sky hole vegetation density.

7. The method according to claim 1 wherein the vegetation information comprises a vegetation type, the first category of vegetation comprising a first vegetation type, the second category of vegetation comprising a second vegetation type.

8. The method according to claim 7 wherein the first vegetation type includes high canopy trees, trees with large trunks, dense crown and/or wide roots, the second vegetation type including trees of the Arecales order.

9. The method according to claim 1, comprising, when the vegetation information at the target dropping area is comprised in the first category of vegetation, seeking an alternate dropping area having a vegetation information in the second category of vegetation, in a neighboring zone of the target dropping area where the vegetation information is in the first category of vegetation.

10. The method according to claim 9, wherein a span of the neighboring zone is at most 5 m to 10 m from the target dropping area where the vegetation density information is in the first category of vegetation.

11. The method according to claim 9, wherein seeking an alternate dropping area comprises moving the flying vegetation detector above the neighboring zone to measure vegetation information at several locations in the neighboring zone, in order to find an alternate dropping area having a vegetation information in the second category of vegetation.

12. The method according to claim 1, comprising, before flying the probe carrier flying vehicle to the target dropping area, obtaining a preliminary survey of potential vegetation information in a region of interest by at least an aerial platform distinct from the or each probe carrier flying vehicle, and defining at least a target dropping area where the potential vegetation is in the second category based on the survey of potential vegetation information.

13. The method according to claim 12, wherein the aerial platform is a satellite, a balloon, an airship, an airplane, an unmanned aerial vehicle and/or a helicopter.

14. A system for dropping a plurality of probes intended to partially penetrate into a ground, to carry out measurements in the ground, comprising:
at least a probe carrier flying vehicle intended to fly above a dropping area on the ground, the probe carrier flying vehicle carrying probes and a launcher, configured to separate each probe from the probe carrier flying vehicle;
an activation unit configured to activate the launcher to separate at least one of the probes from the probe carrier flying vehicle;
at least a flying vegetation detector, the activation unit being configured to determine a vegetation information at a target dropping area of the probe using the flying vegetation detector when the probe carrier flying vehicle is located above a target dropping area before activating the launcher, the flying vegetation detector being an optical detector, wherein the optical detector is a laser or LIDAR;
the flying vegetation detector being configured to send an optical signal towards the ground, and to measure the intensity and/or wavelength of the reflected signal or measuring the reflection time of the signal,
the vegetation information being a vegetation density, a vegetation type or a vegetation height;
the activation unit being configured to analyze the vegetation information received from the flying vegetation detector, in order to determine whether the vegetation information at the target dropping area is comprised in a first category of vegetation, which prevents the dropping of the at least one of the probes or is comprised in a second category of vegetation, which allows dropping of the at least one of the probes,
wherein the activation unit is configured to prevent activation of the launcher when the vegetation information at the target dropping area is comprised in the first category of vegetation and/or is able to allow activation of the launcher when the vegetation information at the target dropping area is comprised in the second category of vegetation.

15. The system according to claim 14, wherein the activation unit is configured to activate the launcher to separate at least one of the probes from the probe carrier flying vehicle when the probe carrier flying vehicle is flying above the dropping area and to let the probe fall from the probe carrier flying vehicle in the ground of the dropping area.

16. The system according to claim 15, wherein the probe carrier flying vehicle carries the flying vegetation detector.

17. The system according to claim 14, comprising a redirector, configured to seek an alternate dropping area in a neighboring zone of the target dropping area if the vegetation at the target dropping area is in the second category of vegetation, a span of the neighboring zone being preferably at most 5 m to 10 m from the target dropping area where the vegetation information is in the first category of vegetation, and/or
comprising a redirector, configured to seek an alternate dropping area in a neighboring zone of the target dropping area if the ground surface at the target dropping area is in the second category of vegetation, a span of the neighboring zone being preferably at most 5 m to 10 m from the target dropping area where the ground surface information is in the first category of ground surface.

* * * * *